(12) United States Patent
Moore

(10) Patent No.: US 6,424,454 B1
(45) Date of Patent: Jul. 23, 2002

(54) BREWSTER-CUT CRYSTAL FOR NONLINEAR FREQUENCY CONVERSION

(75) Inventor: Gerald T. Moore, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 39 days.

(21) Appl. No.: 09/681,181

(22) Filed: Feb. 12, 2001

(51) Int. Cl.⁷ .............................. G02F 1/355; G02B 5/30
(52) U.S. Cl. ...................... 359/326; 359/330; 359/352; 359/487; 359/495; 359/496
(58) Field of Search ................. 359/326–332, 359/352, 487, 495–497

(56) References Cited

U.S. PATENT DOCUMENTS 6,040,942 A * 3/2000 Bergmann .................. 359/487
6,384,973 B1 * 5/2002 Moore ........................ 359/496

OTHER PUBLICATIONS

J. D. Beasley, "Thermal conductivities of some novel non-linear optical materials", Appl. Opt. 33, 1000–1003 (Feb.1994).

K. Kato, "Temperature–tuned 90° phase–matching properties of $LiB_3O_5$," IEEE I Quantum Electron. 30, 2950–2952 (Dec. 1994).

* cited by examiner

Primary Examiner—John D. Lee
(74) Attorney, Agent, or Firm—James M. Skorich; Kenneth E. Callahan

(57) ABSTRACT

A specially cut uncoated birefringent crystal having three Brewster-cut faces with adjacent coated Brewster-cut coupling prisms are used for optical frequency conversion. Two input frequencies are used to obtain a third frequency by sum-frequency generation. The uncoated birefringent crystal permits high power input beams.

2 Claims, 3 Drawing Sheets

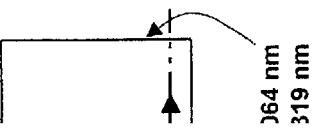
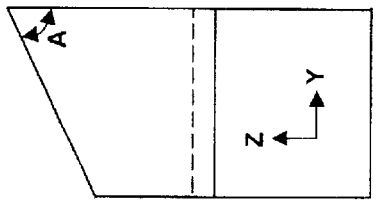
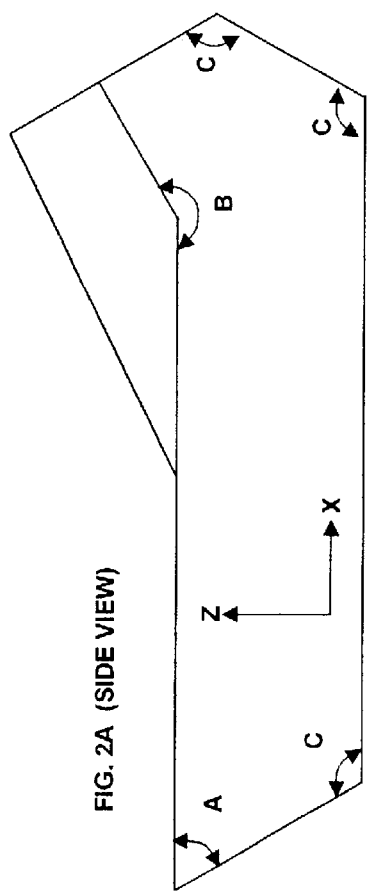
A = 58°
B = 206°
C = 122°
D = 35°
FIG. 2A (SIDE VIEW)
FIG. 2B (TOP VIEW)
FIG. 2C (END VIEW)

BREWSTER-CUT CRYSTAL FOR NONLINEAR FREQUENCY CONVERSION

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

The present invention is in the field of optical frequency conversion using birefringent nonlinear crystals, and in particular, relates to using an uncoated, specially cut lithium triborate (LBO) crystal.

Phase matching in birefringent nonlinear crystals used for optical frequency conversion generally requires a nonlinear interaction between three linearly polarized optical beams propagating in the same direction, but with one of the beams polarized orthogonally to the other two. Usually anti-reflection (AR) coatings are applied to the entrance and exit faces of the crystal, though it can be difficult or impossible to obtain ideal AR coatings for three wavelengths. These optical coatings on nonlinear crystals, however, can be an impediment to using them as frequency-conversion devices at high average power. For example, absorption by coatings on the biaxial crystal lithium triborate (LBO) causes local heating of both the coating and the crystal. Because LBO is extremely transparent at near-infrared and visible wavelengths, coating absorption can be larger than absorption in the bulk crystal. This heating, because of the large and anisotropic thermal expansion of LBO, may cause coatings to buckle or loosen. (J. D. Beasley, Thermal conductivities of some novel nonlinear optical materials, Appl. Opt. 33, 1000–1003 (1994)).

It is an object of the present invention to avoid this heating problem by enabling uncoated birefringent crystals to be used for frequency conversion applications. It is a further object to obtain a sum-frequency-generated optical beam exiting with a polarization in the plane of incidence using an input of two linearly polarized optical beams.

SUMMARY OF INVENTION

The present invention uses three Brewster-cut uncoated planar surfaces on a specially cut birefringent crystal to obtain a third frequency by sum-frequency generation from a two-frequency input. Glass prisms, Brewster-cut on one end, normally cut on the opposite end, and appropriately coated, are placed adjacent to the birefringent crystal's Brewster-cut faces so that the transverse profile of the beams is unaffected by refraction at the Brewster interfaces. The optical frequency conversion of high-powered input beams can be generated without danger of damaging the coatings normally used on birefringent crystals.

BRIEF DESCRIPTION OF DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

FIG. 2A is a side view of the specially cut LBO crystal.

FIG. 2B is a top view of the specially cut LBO crystal.

FIG. 2C is an end view of the specially cut LBO crystal.

DETAILED DESCRIPTION

LBO can be used in many frequency-conversion applications, including second-harmonic generation and optical parametric oscillation. However, only the exemplary specific case of sum-frequency generation of 1064-nm radiation and 1319-nm radiation to produce 589-nm sodium resonance radiation is discussed in detail. This interaction can be phase matched for propagation in the X direction by temperature tuning the crystal. (K. Kato, Temperature-tuned 90° phase-matching properties of $LiB_3O_5$, IEEE J. Quantum Electron. 30, 2950–2952 (1994)). The two infrared (IR) light beams are polarized in the Z direction, and the 589-nm yellow light is polarized in the Y direction.

Figure 1:
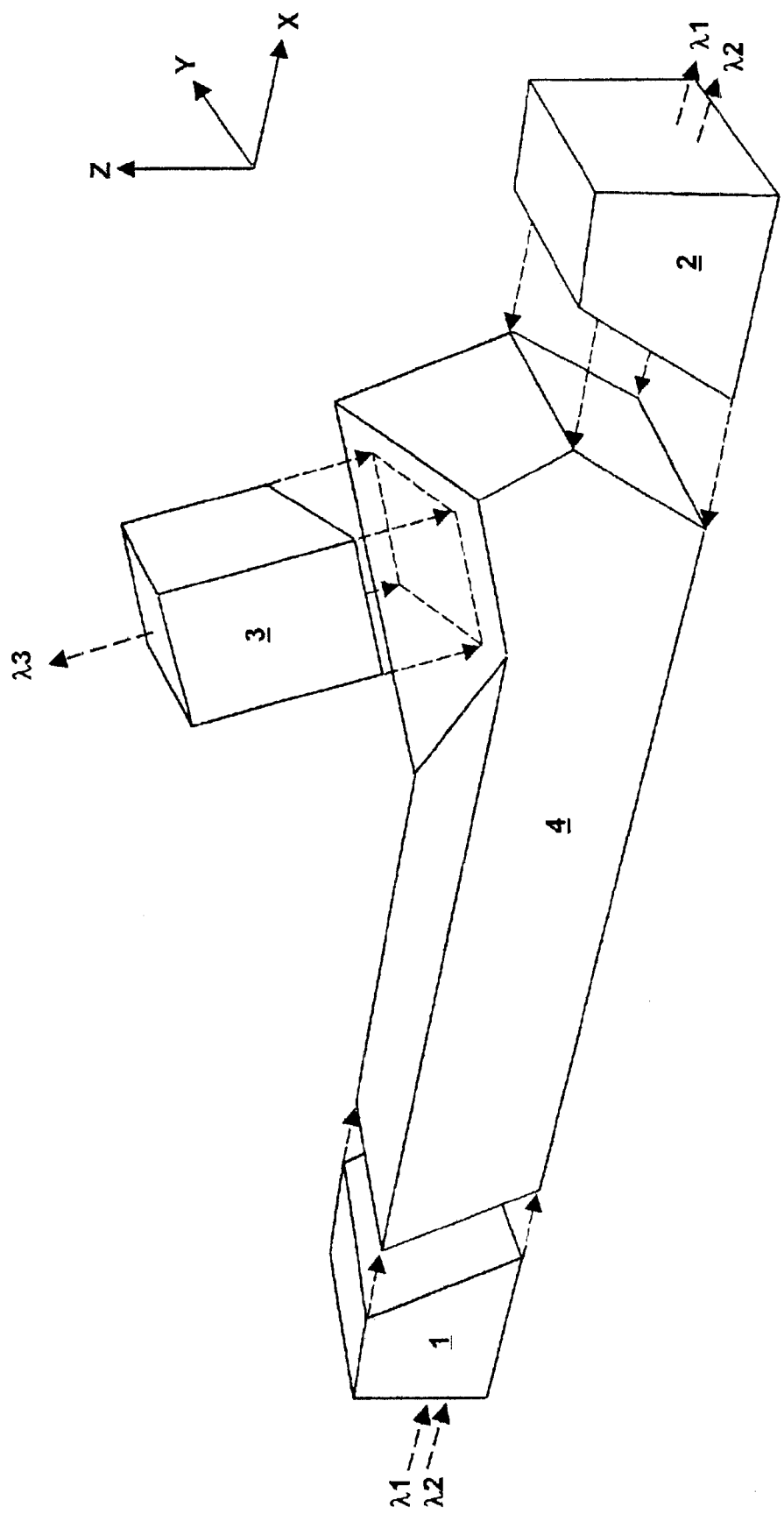
FIG. 1 is a perspective view of the specially cut LBO crystal and 3 prism configuration.

FIG. 1 is an exploded view of the design in which an uncoated LBO crystal 4 cut in a special way, together with three glass prisms 1, 2, 3, is used to couple light into and out of the crystal. FIG. 2 gives side, top, and end views of the specially cut birefringent crystal with the angles indicated for an LBO crystal. The crystal has three surfaces oriented at the Brewster angle (in this case 58 degrees), so that light polarized in the plane of incidence (the X-Z plane for the IR light beams) is completely transmitted through these surfaces. Each of the prisms has one end cut at the Brewster angle and the other end cut normal to the direction of propagation. The prisms are placed so that their Brewster-cut ends are adjacent to the three Brewster-cut surfaces of the crystal. The three prisms serve to maintain directions and circular transverse profiles of the beams. The crystal and prisms can be kept in alignment by inserting them into a machined fixture (not shown) which could be constructed as part of the oven needed for controlling the crystal temperature. The particular angles for the LBO crystal in this configuration are shown in FIG. 2 in top, side, and end views.

As shown in FIG. 1, a first input coupler prism 1 has its input face normal to the two incoming IR beams $\lambda_1$ and $\lambda_2$. This normal face is coated with anti-reflection (AR) coatings matched to these incoming beams. The output face is Brewster-cut such that the IR beams, polarized along the Z-axis with X-Z being the plane of incidence, pass through the input coupler prism. This prism 1 is adjacent to the input end of the birefringent crystal 4, which itself has a Brewster-cut face configured to transmit essentially completely the two input wavelengths. The nonlinear reaction between the two input wavelengths within the birefringent crystal generates a third wavelength $\lambda_3$ by the sum-frequency process. The $\lambda_3$ beam has orthogonal polarization along the Y-axis. Its wavelength is shorter than either of the input wavelengths, calculated from: $1/\lambda_1 + 1/\lambda_2 = 1/\lambda_3$.

The IR beams travel along the X principal crystal axis to the first output end of the birefringent crystal cut at the Brewster angle so that they pass through and out of the birefringent crystal. This same face, however, partially reflects the orthogonally polarized $\lambda_3$ beam. A first output coupler prism 2 adjacent to the first output end of the birefringent crystal has a Brewster-cut face at its input end and a normal-cut face at its output end. This Brewster-cut face of the prism 2 is coated to reflect $\lambda_3$ while transmitting $\lambda_1$ and $\lambda_2$. Its normal face is AR coated to transmit $\lambda_1$ and $\lambda_2$ through and out of the apparatus. The $\lambda_3$ beam then is reflected by both the Brewster-cut first output end of the birefringent crystal and the Brewster-cut input end of the first output prism 2 toward the second output Brewster-cut face of the birefringent crystal. This cut is such as to pass the $\lambda_3$ beam out of the birefringent crystal and into the second output coupler prism 3. This prism 3 has a Brewster-cut input face that is positioned adjacent to the Brewster-cut second output end of the birefringent crystal. It has a normal-cut output face, AR coated, to facilitate the transmission of the $\lambda_3$ beam out of the apparatus.

It is desirable, though not essential, that the glass have an index of refraction close to that of the crystal (about 1.6 for LBO). This prevents beam deflection and allows the beam profiles to be circular both in free space and inside the crystal.

Figure 3:
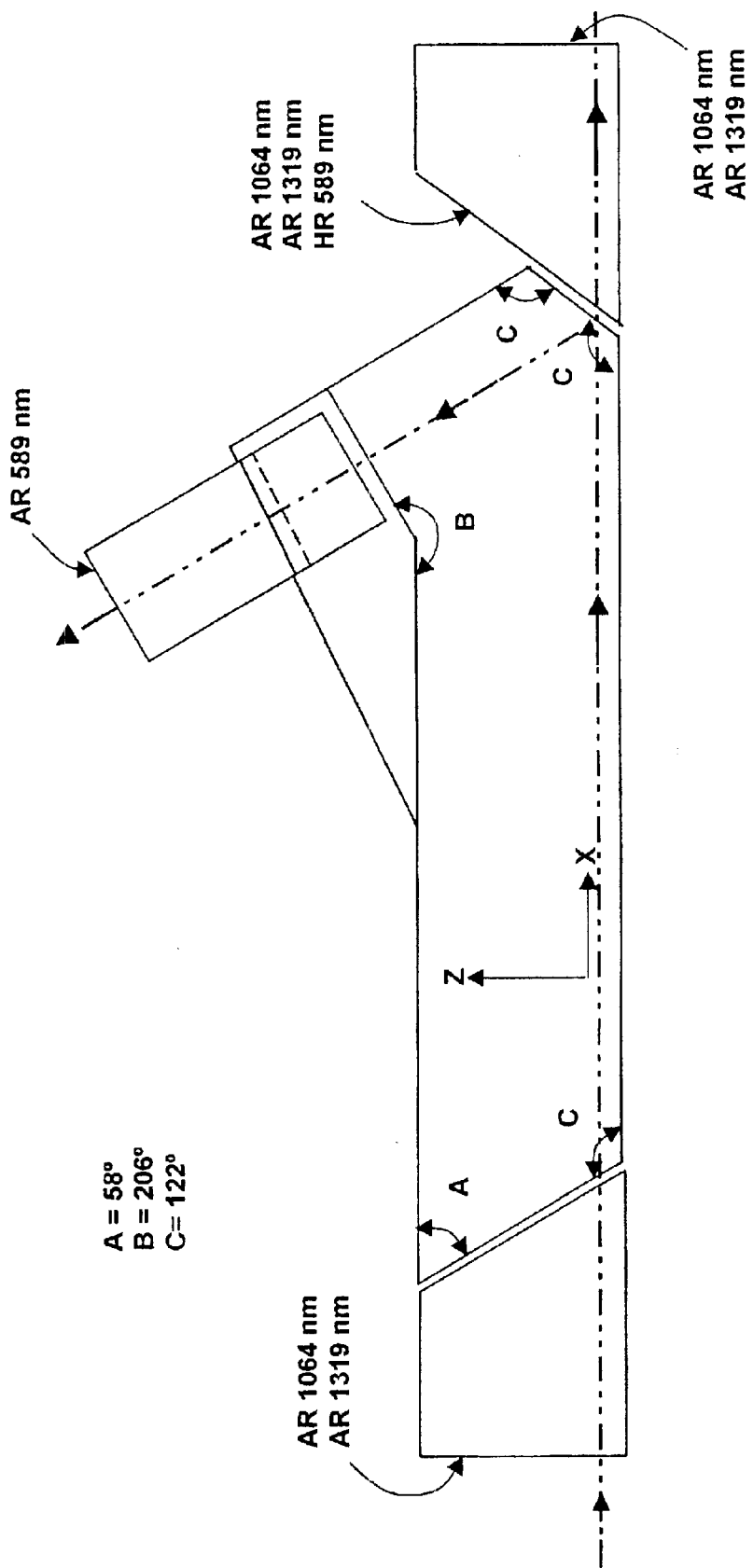
FIG. 3 is a side view of the specially cut LBO crystal with three coated prisms configured to maintain directions and circular transverse profiles of the light beams.

The AR or HR coatings for each surface are shown in FIG. 3, along with the light paths for the 1064 and 1319-nm input wavelengths ($\lambda_1$ and $\lambda_2$) and the sum-frequency generated 589 nm ($\lambda_3$) output wavelength. The IR light enters the input prism 1 and leaves through the first output prism 2 with its polarization in the plane of incidence (X-Z plane). The visible light ($\lambda_3$) with orthogonal polarization is reflected at the Brewster-cut face of the first output prism 2 and at the adjacent Brewster-cut face of the crystal. It exits through the second output Brewster-cut face of the crystal and through the adjacent second output prism 3. The exiting visible light is also polarized in the plane of incidence.

For second-harmonic generation, only one input IR beam is needed. For example, the LBO crystal can be temperature tuned for second-harmonic generation of 1064-nm Nd:YAG radiation. Tunable optical parametric oscillation or difference-frequency mixing can be used to convert visible to infrared radiation. In this case the beam directions are reversed from those shown in FIG. 3, so that incident visible light enters prism 3 and infrared radiation enters prism 2 and exits through prism 1. For optical parametric oscillation one or both of the IR beams circulates in an optical resonator and both IR beams are generated within the parametric oscillator. For difference-frequency mixing only one IR beam is injected into prism 2 and the other is generated within the crystal and exits through prism 1.

While tunability may be improved by using different coatings over different wavelength ranges, the coated elements are inexpensive glass, rather than an expensive specially cut crystal. The technique described here can also be used with other kinds of crystals. An example is lithium niobate, which can be non-critically phase-matched orthogonally to its optical axis for some choices of wavelength. However, it is more difficult to prevent beam deflection by using prisms when a crystal of high refractive index, such as lithium niobate, is used.

What is claimed is:

1. An apparatus for optical frequency conversion using a specially cut uncoated birefringent crystal with a primary optical (X-axis) wherein a first input wavelength and a second input wavelength polarized along the Z axis combine within said birefringent crystal by the sum-frequency process to generate a third, shorter wavelength polarized along the Y, said apparatus comprised of:

a first input coupler prism 1 having an input face normal to the propagation direction of said input wavelengths with anti-reflection coatings matched to said input wavelengths and an output Brewster-cut face such that said input wavelengths are completely transmitted through said input coupler prism;

a specially cut birefringent crystal 4 having a Brewster-cut input end adjacent to said first input coupler prism, a first output end having a Brewster-cut face such that said input wavelengths pass through and out of said birefringent crystal while said third wavelength is partially reflected to a third Brewster-cut face configured to transmit said third wavelength out of said birefringent crystal;

a first output coupler prism 2 adjacent to said first output end of said birefringent crystal and having an input Brewster-cut face configured to transmit said input wavelengths and to reflect said third wavelength and coated with anti-reflection coatings matched to said input wavelengths and a high-reflection coating matched to said third wavelength and, further, having an output face normal to said input wavelengths with anti-reflection coatings matched to said input wavelengths;

a second output coupler prism 3 adjacent to a second output end of said birefringent crystal and having an input Brewster-cut face configured to transmit said third wavelength and having an output face normal to said third wavelength with an anti-reflection coating matched to said third wavelength, thereby facilitating the transmission of said third wavelength out of said birefringent crystal.

2. The birefringent crystal apparatus of claim 1, wherein said birefringent crystal is composed of lithium triborate (LBO) and said three prisms have an index of refraction approximately the same as said LBO crystal.

* * * * *